United States Patent [19]

Schulz et al.

[11] Patent Number: 4,549,726
[45] Date of Patent: Oct. 29, 1985

[54] MOUNTING MEMBER FOR MOUNTING AN ENGINE OR TRANSMISSION OF A MOTOR VEHICLE

[75] Inventors: Ralf-Thilo Schulz, Putzbrunn; Helmut Rapp, Brunnthal, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 540,889

[22] Filed: Oct. 11, 1983

[30] Foreign Application Priority Data

Oct. 19, 1982 [DE] Fed. Rep. of Germany ....... 3238587

[51] Int. Cl.⁴ .................. B32B 17/04; B32B 27/04
[52] U.S. Cl. ............................ 267/140.5; 267/149; 428/105; 428/112; 428/113; 428/902
[58] Field of Search ............... 428/105, 113, 112, 188, 428/35, 902; 267/140.5, 148, 149

[56] References Cited

U.S. PATENT DOCUMENTS 3,466,219  9/1969  Schwartz ........................ 428/105
3,768,760 10/1973  Jensen ........................... 428/105
4,177,306 12/1979  Schulz et al. .................... 428/113
4,340,250  7/1982  Ward ............................ 248/629
4,371,142  1/1983  Bottemiller et al. ............. 248/573

FOREIGN PATENT DOCUMENTS 652309  4/1951  United Kingdom ............ 267/140.5

Primary Examiner—Paul J. Thibodeau
Attorney, Agent, or Firm—W. G. Fasse; D. H. Kane, Jr.

[57] ABSTRACT

A mounting member for mounting an engine or transmission on a supporting structure of a motor vehicle, is constructed as a one piece integral component made of fiber compound material in which the fiber layers have defined, preselected orientations. The damping characteristics can be optimally tuned for specific types of use or vehicles by controlling the materials and orientation of the fibers in each layer, and by controlling the number of layers. Additional damping may be achieved by inserting an elastomeric intermediate layer between the individual fiber layers. The shape of the mounting member also varies according to the load or stress to which the member will be exposed in use. The available space and the type of motor vehicle in which the member will be used are also taken into account in determining the shape, cross-sectional configuration and other structural details of the mounting member.

13 Claims, 5 Drawing Figures

MOUNTING MEMBER FOR MOUNTING AN ENGINE OR TRANSMISSION OF A MOTOR VEHICLE

BACKGROUND OF THE INVENTION

This invention relates to a support member for mounting or suspending the engine or transmission on a supporting structure of a motor vehicle. The support members for suspending the engine or transmission of a motor vehicle presently comprise, in general, a rigid metal element and an elastomeric material block. The rigid metal element is fastened to the motor or transmission, while the elastomeric material block is arranged between the rigid metal element and a metal plate that is fastened to the supporting structure of the vehicle. Such support members not only have a relatively large weight, but also leave much to be desired with regard to noise and vibration damping.

It is known from German Patent Publication (DE-OS) No. 3,021,676 to embed oriented fibers in the elastomeric material block for achieving a variable compliance of the elastomeric material block in different directions, for example to inhibit an excessive pitching motion of the engine.

OBJECTS OF THE INVENTION

In view of the above it is the aim of the invention to achieve the following objects singly or in combination:

to provide a mounting for an engine or transmission of a motor vehicle that enables a noise and vibration reduction which is optimally tuned to the particular motor vehicle in question;

to provide a mounting for the engine or transmission which is lightweight, yet of superior strength; and to construct the mounting member as an integral single piece component which performs the mounting function and the vibration damping function simultaneously.

SUMMARY OF THE INVENTION

The mounting member according to the invention comprises a single, integral structural part produced of fiber compound material such as fiber reinforced resin and including flanges or plates for attachment to an engine transmission, and which serves as a spring for vibration damping as well as a damper for noise damping.

In addition to its light weight, the mounting member according to the invention has the following advantages: its integral damping quality, its long useful life, and its good ability to be tuned to the frequencies required by the motor vehicle for which the mounting member is intended.

Glass, aramid, or carbon fibers with a diameter of 5 to 16 $\mu$ are preferbly used as the fibers in the fiber compound materials. The eigenfrequencies and the damping characteristics of the mounting member can be controlled by the build-up of the fiber compound material out of several layers each having a definite fiber orientation relative to the fiber orientation in other layers. Similarly, an additional damping effect may be achieved by inserting elastic intermediate layers between the individual fiber compound material layers.

The shape or geometry of the present mounting member depends upon the respective motor vehicle and on the stress or loading of the member. Its length will depend on the usable space between the engine or transmission and the supporting structure of the vehicle. The present mounting member is just as variable, in regard to its form or shape as the well known support structures comprising a rigid metal element and an elastomeric material block.

It is to be understood, that fiber compound materials suitable for the present purposes comprise fibers with a high tensile strength and/or rigidity, relative to their weight, and having a hardened or cured reaction matrix according to German Industrial Standards (DIN-16.945). The fibers in the mounting member are oriented completely in the direction of the force flow. If necessary, the fiber orientation may be determined with the aid of computer programs, whereby such fiber orientation is not lost by the effects of any finishing processes. Resins in the sense of DIN-16.945 are oligomers and/or polymers that react when treated so that they polymerize, for example, epoxy, polyester, or phenylester resins are suitable. Furthermore, the matrix may comprise phenol or polyimid resins.

The elastomeric material that may be utilized as the intermediate layer or layers in the mounting member according to the invention, is an elastomeric material in the sense of the material performance sheets of aviation standards.

BRIEF FIGURE DESCRIPTION

In order that the invention may be clearly understood, it will now be described, by way of example, with reference to the accompanying schematic drawings, wherein.

DETAILED DESCRIPTION OF PREFERRED EXAMPLE EMBODIMENTS AND OF THE BEST MODE OF THE INVENTION

Figure 1:
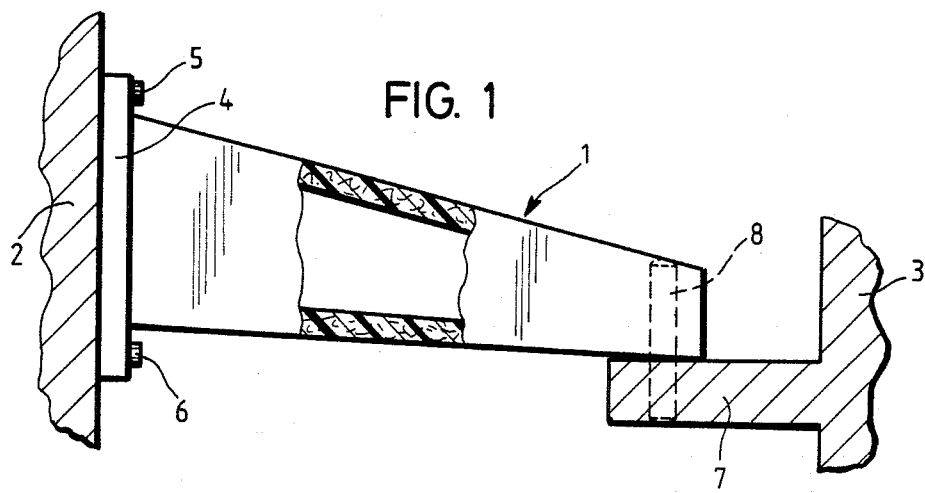
FIG. 1 shows a side view of a hollow mounting member according to the invention having a rectangular cross-section for mounting an engine or transmission.

As shown in FIG. 1, a mounting member 1 is arranged between an engine 2 and a support structure 3 of a motor vehicle, whereby the support structure may be a chassis part or any other selfsupporting vehicle component.

The end of the mounting member 1 adjacent to the engine 2 is provided with a fastening plate 4 having openings through which schematically shown bolts 5 and 6 extend to fasten the mounting member 1 to the engine 2.

The other end of the mounting member 1 is supported on a flange 7 of the vehicle support structure 3. This end of the mounting member 1 has a bore hole through which a schematically shown pin 8 extends for fixing the mounting member 1 in its position in a bore hole in the flange 7 of the support 3.

The mounting member 1 is made as a hollow section member having a rectangular cross-section and as an integral one piece component of a fiber compound material. The fastening plate 4 is also made of fiber compound material together with the member 1. The thickness of the walls of the hollow section body of the member 1 amounts to only a few millimeters. This thickness depends primarily on the load, the length of the mounting member 1 and on the type of motor vehicle.

The fiber compound material is built up to include several layers, whereby the individual layers a, b, c, d, . . . x, y, z each have a different fiber orientation (FIG. 2) relative to the long axis of the mounting member 1 extending from the engine 2 to the support 3. This long axis is also referred to as the 0° axis.

Figures 2, 3:
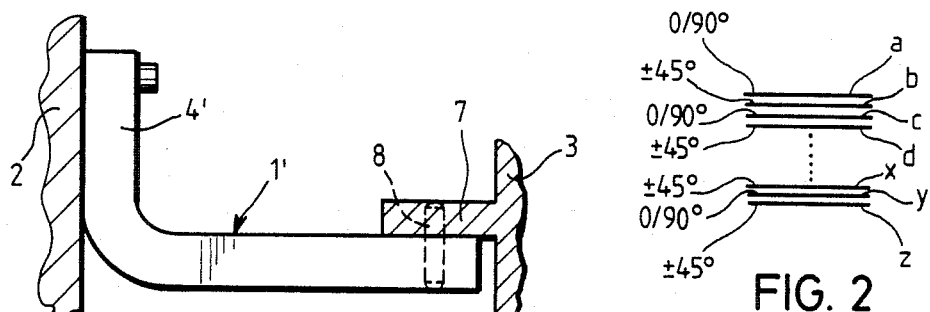
FIG. 2 shows the orientation of the fibers of the individual layers of the hollow section mounting member according to FIG. 1.
FIG. 3 shows a side view of an L-shaped mounting member constructed of a flat section.

In FIG. 2, the fibers of the individual layers a, b, c, d, . . . x, y, z of the mounting member 1 of FIG. 1, are arranged in the plane of the layer and so that the fibers of each layer extend perpendicularly to adjacent fiber layers. For example, the layers may be made of webbings in which the fibers form a rectangular mesh. The individual layers a, b, c, d, . . . x, y, z may comprise alternatively layers a, c, . . . y with a fiber orientation of 0° or 90° (0°/90°) to the long 0° axis of the support structure, and layers b, d, . . . x, z may have a fiber orientation of +45° and −45° (±45°) to the long 0° axis of the member 1, whereby layers a, c, y with a 0°/90° fiber orientation alternate with layers b, d, x, z with a ±45° fiber orientation.

As an example, a mounting member 1 with a wall thickness of from 5 to 7 mm, a length of 160 mm, and an outer cross-section of the hollow section member of 18×18 mm at the supported end and 90×46 mm at the engine end was demonstrated to have a substantially unlimited fatigue strength under a mass load or stress of 160 kg (per mounting member) and under forces in the x-direction (0° axis) and in the y-direction of 1g, and in the z-direction of 3g. The bending shear stress is substantially taken up by the side walls.

A rectangular cross-section of the hollow section member is preferable to a round cross-section primarily because it is easier to produce.

Figure 5:
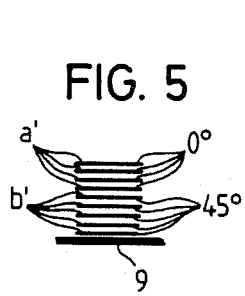
FIG. 5 shows the orienation of the fibers in the individual layers in the flat sectional members according to FIGS. 3 and 4.
Figure 4:
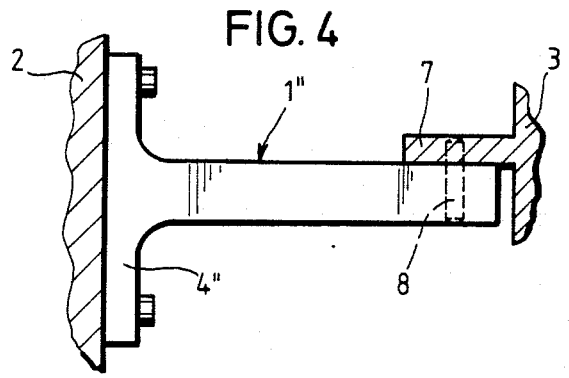
FIG. 4 shows a side view of a mounting member constructed of a flat T-section.

The example embodiments according to FIGS. 3 to 5 differ from that of FIGS. 1 and 2 mainly in that the hollow section member is replaced by a flat section member and the build-up of layers according to FIG. 5 is used, rather than that according to FIG. 2.

In the example embodiment according to FIG. 3, the mounting member 1' is formed in an L-shape, whereby the short shank of the L serves as the fastening plate 4'. In the example embodiment according to FIG. 4, the mounting member 1" has a T-shape, whereby the cross-beam of the T forms the fastening plate 4". Whether to use an L or T shape for the mounting member 1' or 1" depends, for example, on the loading of the mounting member and on the arrangement of the engine relative to the carriage, chassis or other self-supporting component of a vehicle.

According to FIG. 5, the fibers of the individual layers a' of the example embodiments of FIGS. 3 and 4, are arranged parallel to each other, whereby the individual layers a', b' comprise layers a' with a fiber orientation of 0° to the long 0° axis of the mounting member and layers b' with a fiber orientation of +45° and −45° to the long 0° axis of the mounting member.

Several layers a' with a fiber orientation of 0° to the long 0° axis of the mounting member are followed by several layers b' with a fiber orientation of ±45° to the long 0° axis of the mounting member whereupon an intermediate layer 9, of an elastomeric material is inserted. Several layers follow and rest against this intermediate layer 9, not shown in FIG. 5. First, several layers with a fiber orientation of ±45° to the long 0° axis of the mounting member follow the intermediate layer 9. Then follow several layers with a fiber orientation of 0° to the long 0° axis of the mounting member. The number of layers a' compared to the number of layers b' again depends on the application or use of the mounting member.

Although the invention has been described with reference to specific example embodiments, it is to be understood that it is intended to cover all modifications and equivalents within the scope of the appended claims.

What is claimed is:

1. A mechanical mounting system for mounting a drive unit of a vehicle in a vehicle chassis, comprising a noise producing, mechanically vibrating drive unit, a support structure in said vehicle chassis for supporting said drive unit, a plurality of mounting members mounting said drive unit to said support structure, each of said mounting members comprising an elongated body portion having a longitudinal axis extending substantially horizontally in its use condition, a connection end rigidly connected to said vibrating drive unit, and a mounting end rigidly connected to said support structure, said body portion, said connection end, and said mounting end of each of said mounting members being made of fiber reinforced resin material as an integral, single piece spring having a predetermined orientation of fibers in said fiber reinforced resin material relative to said longitudinal axis extending substantially horizontally, said fiber reinforced resin material comprising several fiber layers, wherein the fiber orientations vary from fiber layer to fiber layer or groups of layers relative to said longitudinal axis extending substantially horizontally from said drive unit to said support structure for providing a sufficient spring stiffness causing simultaneously a mechanical vibration damping and an acoustical noise damping by said plurality of mounting members.

2. The mounting member of claim 1, wherein at least said body portion comprises a hollow section.

3. The mounting member of claim 2, wherein said hollow section has a rectangular cross-sectional shape.

4. The mounting member of claim 1, wherein at least said body portion comprises a flat section.

5. The mounting member of claim 1, wherein the fibers of individual fiber layers (a, b, c, . . . x, y, z) of said fiber reinforced resin material are arranged perpendicularly to each other, and wherein the individual fiber layers (a, b, c, . . . x, y, z) comprise fiber layers (a, c, . . . y) with a fiber orientation of zero and 90° relative to said longitudinal axis and fiber layers (b, c, . . . x, z) with a fiber orientation of +45° and −45° relative to said longitudinal axis of the mounting member.

6. The mounting member of claim 5, wherein said individual fiber layers (a, b, c, . . . x, y, z) of fiber reinforced resin material comprise fiber webbings.

7. The mounting member of claim 5, wherein fiber layers (a, c, . . . y) with a zero or 90° fiber orientation alternate with layers (b, d, . . . x, z) with a ±45° fiber orientation.

8. The mounting member of claim 7, wherein said individual fiber layers (a, b, c, . . . x,y,z) of fiber reinforced resin material comprise fiber webbings.

9. The mounting member of claim 1, wherein the fibers of the individual fiber layers (a', . . . ) are arranged in parallel to each other, and wherein the individual fiber layers (a', b', ...) comprise fiber layers (a') with a fiber orientation of 0° to said longitudinal axis of the mounting member and fiber layers (b') with a fiber orientation of +45° and −45° to said longitudinal axis of the mounting member.

10. The mounting member of claim 1, wherein said fiber reinforced resin material comprises a plurality of fiber layers and an intermediate layer (9) of an elastomeric material provided between said fiber layers (a', b', ...).

11. The mounting member of claim 1, wherein the fibers of the fiber reinforced resin material comprise glass fibers.

12. The mounting member of claim 1, wherein the fibers of the fiber reinforced resin material comprise carbon fibers.

13. The mounting member of claim 1, wherein the fibers of the fiber reinforced resin material comprise aramid fibers.

* * * * *